US006874804B2

(12) United States Patent
Reese et al.

(10) Patent No.: US 6,874,804 B2
(45) Date of Patent: Apr. 5, 2005

(54) UNIVERSAL HITCH AND RECEIVER ASSEMBLY

(75) Inventors: Timothy A. Reese, Greenville, SC (US); Robert R. Reed, Greer, SC (US)

(73) Assignee: TB & B Partners, Greer, SC (US)

( * ) Notice: Subject to any disclaimer, the term of this patent is extended or adjusted under 35 U.S.C. 154(b) by 134 days.

(21) Appl. No.: 10/219,047

(22) Filed: Aug. 14, 2002

(65) Prior Publication Data

US 2004/0032112 A1 Feb. 19, 2004

(51) Int. Cl.$^7$ .............................. B60R 9/06; B60D 1/36
(52) U.S. Cl. ................... 280/477; 280/511; 224/520
(58) Field of Search ................ 280/477, 511, 280/415.1, 416.1, 491.2, 491.5, 163, 164.1; 224/519, 520, 521

(56) References Cited

U.S. PATENT DOCUMENTS

| 3,765,703 | A | * | 10/1973 | Voelkerding et al. | ........ 280/477 |
| 4,202,562 | A | * | 5/1980 | Sorenson | ................. 280/415.1 |
| 4,301,953 | A | * | 11/1981 | Abbott | ........................ 224/519 |
| 4,381,069 | A | * | 4/1983 | Kreck | ........................ 224/502 |
| 4,561,575 | A | * | 12/1985 | Jones | ....................... 224/42.21 |
| 4,919,229 | A | | 4/1990 | Wells | ............................ 182/17 |
| 4,938,399 | A | * | 7/1990 | Hull et al. | .................... 224/521 |
| 5,232,135 | A | * | 8/1993 | Marren | ........................ 224/509 |
| 5,267,748 | A | | 12/1993 | Curran | ..................... 280/415.1 |
| 5,330,196 | A | | 7/1994 | Ricles | ......................... 280/477 |
| 5,549,316 | A | | 8/1996 | Jones | .......................... 280/477 |
| 5,697,630 | A | | 12/1997 | Thompson et al. | ......... 280/477 |
| 5,779,256 | A | | 7/1998 | Vass | ............................ 280/477 |
| 5,803,475 | A | * | 9/1998 | Dick | ........................... 280/163 |
| 5,884,930 | A | * | 3/1999 | Cluth | ......................... 280/497 |
| 5,950,890 | A | | 9/1999 | Darby | ......................... 224/402 |
| 6,039,227 | A | * | 3/2000 | Stark | ........................... 224/521 |
| 6,089,431 | A | * | 7/2000 | Heyworth | .................... 224/521 |
| 6,102,422 | A | * | 8/2000 | Damron | ..................... 280/477 |
| 6,511,088 | B2 | * | 1/2003 | Kahlstorf | ................. 280/415.1 |

FOREIGN PATENT DOCUMENTS

EP 0128088 * 12/1984

OTHER PUBLICATIONS

Custom Welded Series 44 Hitch Class 3 & 4, 4400 Receiver, manufactured by Reese Trailer Hitch Products and marketed by The Pit Crew, Inc. of Louisville Kentucky.
Cargo Carrier & Accessories, Part # 52018, manufactured by Reese Hitch Products and marketed online by The Pit Crew, Inc. of Georgetown, Indiana.
EZ–HITCH Trailer Alignment Guide marketed by Doug's Antique Ford Parts Of Little Rock, Arkansas.

* cited by examiner

*Primary Examiner*—Anne Marie Boehler
(74) *Attorney, Agent, or Firm*—Patent Consultant & Services; Robert R. Reed

(57) ABSTRACT

According to the present invention, a hitch and receiver system provides at least an additional vertical box receiver when a conventional box receiver of the vehicle hitch is in use to provide draw bar support for the hitch ball. In a second embodiment, an additional horizontal box receiver is also provided for the hitch and receiver system. The additional box receivers are used to hold and support various accessory devices. In some cases the hitch ball can be used to tow a trailer without removal of the accessory device. The unique accessory device of this invention includes one of a hitch guide accessory device, an access platform and step accessory device, and a cargo cage accessory device. The combination of a hitch and receiver "system" and an accessory device provides the "assembly" of this invention.

10 Claims, 6 Drawing Sheets

UNIVERSAL HITCH AND RECEIVER ASSEMBLY

BACKGROUND OF THE INVENTION

This invention is directed to providing a means for someone to have a conventional hitch receiver for a vehicle as well as additional receivers for different accessories, and in particular to provide at least a vertical receiver and alternately a vertical receiver and a horizontal receiver to receive and support various accessory devices.

The importance of having different vehicle attached accessories to assist the user in doing a job or using a vehicle for pleasure is critical to the marketing of many products. Safety and convenience are of primary concern in any use of a vehicle, especially when towing a trailer behind the vehicle or working out of the back of a vehicle. Construction workers depend on their vehicles to transport their materials and tools from place to place and to provide working platforms on the job site. A number of accessory devices are used by the worker including tool boxes, work benches, cargo platforms, a vice, a metal break, a pipe bender and the like. Each of these items require some type of support for holding, supporting and stabilizing the accessory item when in use. Pleasure users have additional needs, especially the need to tow a boat trailer, a mobile home, a motor cycle trailer or other similar accessory items. In addition, some private users carry their bicycles, kayaks, skis and other accessories at the rear of the vehicle, which are generally supported by additional framework attached to and supported by the vehicle and/or vehicle hitch. Typical examples are disclosed in U.S. Pat. Nos. 5,267,748 and 5,950,890. Both of these accessory items use the conventional receiver of the vehicle hitch when the hitch ball system is removed.

A particular safety problem is associated with towing a trailer. This problem exists when connecting the hitch ball with the coupler of the trailer. The driver of the vehicle is backing the vehicle to position the hitch ball directly below the end of the coupler of the trailer. The problem is, the driver generally cannot see the hitch ball or the coupler. The driver can actually run the rear of the vehicle into the coupler and do a considerable amount of damage to the vehicle. Numerous inventions have been patented to assist the driver, including mirrors and other hitch guides. Typical inventions of hitch guides are disclosed in U.S. Pat. Nos. 5,330,196; 5,549,316; 5,697,630; and 5,779,256. These patents disclose guide plates to direct the coupler of a trailer to be positioned over the hitch ball of a trailer hitch. The hitch guides of these references are not made to resist the greater loads of the contractor and do not prevent the coupler from going over the top edge of the guide plates.

Another problem with vehicles having storage on the top rear section of the vehicle is the ability to access these elevated areas well above the ground level. In addition, many vehicles have beds or passenger compartments accessed from the rear of the vehicle which are at a height above the ground which is difficult for someone to access from the ground. In many cases the person wanting to access these areas must first sit down, swing their legs up and stand up to place themselves in the bed or passenger compartment of a vehicle. A working platform for accessing elevated portions of a vehicle is disclosed in U.S. Pat. No. 4,919,229. This platform and step is used in conjunction with a tire to be supported at the side of the vehicle by the tire. For safety reasons, a need exists to have a platform and step which can be easily supported at the rear of the vehicle as an accessory device to other vehicle equipment, such as a trailer hitch.

A further problem is created by using the conventional receiver to help support accessory devices used with a work type truck used by a contractor. The hitch ball system used to tow trailers and the like must be removed and stored to make the center bore of the conventional available to receive a tongue of the accessory devices. A typical accessory device that uses the conventional receiver was previously disclosed as U.S. Pat. No. 5,267,748. A vehicle tool platform apparatus (accessory device) includes an elongated angle support bar having an end adapted to be received and secured in the receiver of a rear trailer hitch. However, the hitch ball system must be removed and stored for installing this tool platform.

A further problem with vehicles is the need to carry cargo and equipment at the rear of the vehicle much like the elevated rack is used to carry items above the roof level of a vehicle. Cargo and equipment racks or cages are used to carry bicycles, motorcycles, skis and the like at the rear area of the vehicle. Typical cargo carriers are made by Reese Hitch Products (www.reesehitch.com) and marketed by The Pit Crew. Inc of Georgetown, Ind. Generally speaking, these support systems are separate structures supported by the vehicle, or used with the conventional receiver when the hitch ball system for the trailer has been removed. A further need exists to have cargo and equipment racks or cages which can be easily supported at the rear of the vehicle as an accessory device using a standard receiver without the need to remove the hitch ball.

The need exists to provide a conventional trailer hitch or hitch ball and receiver system with the means for supporting other accessory devices that perform other functions at the rear of the vehicle without removing the hitch ball system. A typical conventional receiver in the industry is Part Number 44005 manufactured by Reese Trailer Hitch Products and marketed by The Pit Crew, Inc. of Louisville, Ky. When this receiver is being used by the installation of a draw bar and hitch ball system, the conventional receiver can no longer be used for other accessory devices. For example, generally speaking, a hitch guide, an access platform and step, a cargo cage and the like are accessory devices that must have their own separate support system when the hitch ball system is installed. The use of the conventional receiver to help support the accessory devices is possible only when the hitch ball system is removed and stored.

Accordingly, an object of the present invention is to provide a combination hitch and receiver system and assembly having at least a vertical box receiver to accept an accessory tongue member to help support and hold an accessory devices at the rear of a vehicle while maintaining a hitch ball for a trailer and the like.

Another object of the present invention is to provide a hitch and receiver assembly having at least an additional vertical receiver to accept a accessory tongue member of an accessory device to help support and hold the accessory device at the rear of a vehicle.

A further object of the present invention is to provide a hitch and receiver assembly having an additional vertical receiver to receive a vertical tongue member of a hitch guide accessory device for guiding a coupler of a trailer to be positioned over a hitch ball.

Still another object of the present invention is to provide a hitch and receiver assembly having an additional vertical receiver to receive a vertical tongue member of an access platform and step accessory device for providing easy access to elevated areas of the vehicle, as well as the trailer connected to the trailer hitch.

Yet another object of the present invention is to provide a hitch and receiver assembly having an additional vertical receiver and an additional horizontal receiver to accept the accessory tongue or tongues of an accessory device to help support and hold the accessory device at the rear of a vehicle.

Still yet another object of the present invention is to provide a universal hitch and receiver assembly having an additional horizontal receiver to receive a horizontal tongue member of a cargo rack or cage for providing the capacity to carry cargo and equipment without the need to remove and store the hitch and receiver system.

SUMMARY OF THE INVENTION

The above objectives are accomplished according to the present invention by a hitch and receiver system along with an accessory device to provide a universal hitch and receiver assembly. When a box receiver of a conventional trailer hitch is used to receive the draw bar supporting a hitch ball for pulling a trailer, the conventional receiver is not available for accessory devices supported at the rear of a vehicle. The hitch ball system must be removed and stored before the conventional receiver is available for the accessory device. The present invention provides for at least one additional vertical box receiver to be used to help support the accessory without removing the hitch ball. In a second embodiment, an additional horizontal box receiver is also provided. The hitch and receiver assembly of this invention includes at least a vertical box receiver with a vertically disposed aperture to receive an accessory tongue member of the accessory device. Conventional hitch ball systems do not have additional receivers to support accessory devices.

In one embodiment of the invention a combined hitch and receiver assembly is provided for attachment to a conventional box receiver of a vehicle hitch used for towing a trailer and the like with a hitch ball. The system comprises a main horizontal tongue member having a size and shape to be placed into and held by the conventional box receiver of the vehicle hitch. At least an elongated vertical box receiver, affixed to the main tongue member, is provided having a tubular shape, a center aperture and multiple spaced apart transverse aperture pairs. A ball support member is affixed to the elongated vertical box receiver for receiving and supporting the hitch ball for towing the trailer.

The system further includes an accessory device having an accessory tongue member removably placed in said center aperture of the elongated vertical box receiver to provide the assembly. The vertical box receiver envelops the accessory tongue member and the accessory tongue member supports and holds said accessory device in a generally stationary position relative to the vehicle at the rear of the vehicle. The accessory device can be removed prior to towing the trailer with said hitch ball to comprise the hitch and receiver system.

In one aspect of the invention the accessory tongue member has spaced apart apertures. A retainer pin is aligned with a transverse aperture pair of the vertical box receiver and placed through the transverse aperture pair and a respective aperture of the accessory tongue member. The retainer pin supports and holds the accessory device attached to the vertical box receiver of the hitch and receiver system.

In another aspect of the invention the system includes an elongated horizontal box receiver in addition to a modified vertical box receiver. The horizontal box receiver also has a tubular shape, a center aperture and transverse aperture pairs; so that the horizontal and vertical box receivers are both available for receiving and holding said accessory tongue member of the accessory device using the retainer pin.

The unique accessory device of this invention includes one of a hitch guide accessory device, an access platform and step accessory device, and a cargo cage accessory device.

In another embodiment of the invention, a universal hitch and receiver assembly for a conventional box receiver of a vehicle hitch is provided to assist in connecting with a coupler of a trailer and the like. The assembly comprises a main horizontal tongue member having a size and shape to be placed into and held by the conventional box receiver of the vehicle. At least one elongated receiver is affixed to the main horizontal tongue member. The receiver has a tubular shape, a center aperture and multiple transverse aperture pairs. A ball support member is affixed to the at least one elongated box receiver for receiving and supporting a hitch ball for towing the trailer. A hitch guide accessory device including a vertical tongue member is removably placed in said center aperture of the at least one elongated box receiver. The vertical tongue member supports and holds the hitch guide accessory device in a generally stationary position relative to the vehicle hitch. The hitch guide accessory device is removed prior to towing the trailer with the hitch ball to avoid interference with the coupler when turning the vehicle relative to the trailer.

In one aspect of the other embodiment the at least one elongated receiver includes a vertical box receiver for receiving a vertical tongue member of the hitch guide accessory device to support and hold the hitch guide accessory device generally above the hitch ball at the rear of the vehicle.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3A is a perspective view of an access platform accessory device with a vertical tongue member to be inserted in the vertical receiver of FIG. 3 to form a universal hitch and receiver assembly;

DESCRIPTION OF A PREFERRED EMBODIMENT

Referring now in more detail to the drawings, the invention will now be described in more detail. The universal hitch and receiver assembly of this invention provides an additional box receiver or two additional box receivers when a conventional box receiver of the vehicle hitch is in use to provide draw bar support for the hitch ball. The additional box receivers are used to hold and support various accessory devices without removing and storing any components of the hitch and receiver system. In some cases the hitch ball can be used to tow a trailer without removal of the accessory device. A variety of accessory devices are available in the industry that use the conventional receiver as a supporting member. The combination of a hitch and receiver system and an accessory device provides the "assembly" of this invention. The following disclosure further defines unique accessory devices that can alternately be used to form the universal hitch and retainer assembly of this invention. Conventional accessory devices can be modified and others can be designed to be used to provide the universal hitch and receiver assembly.

Figure 1:
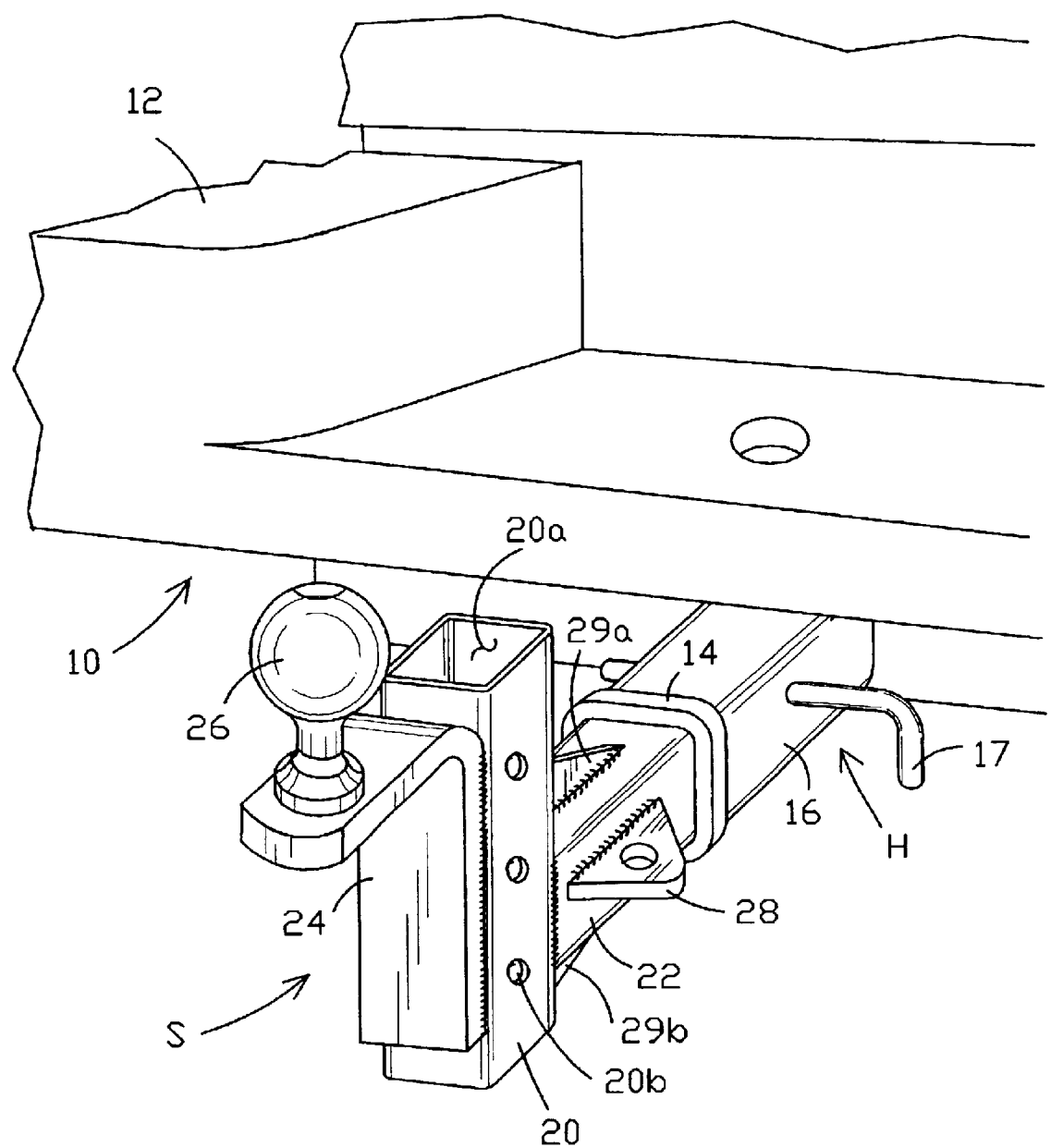
FIG. 1 is a perspective view of a universal hitch and receiver showing a vertical receiver affixed to a main horizontal tongue member inserted in a conventional receiver of the vehicle, the vertical receiver positioned to receive an accessory device.

The portions of the assembly illustrated in FIG. 1 include the hitch and receiver system "S" connected with a vehicle hitch "H" installed below the rear bumper 12 of a vehicle 10. The accessory device has been removed to better illustrate main supporting components of the universal hitch and receiver assembly. A conventional box receiver 16 of the vehicle hitch receives a main horizontal tongue member 22 of the hitch and receiver system, which is held in place with a main receiver pin 17. A single elongated vertical receiver 20 is provided with this embodiment of the invention. Another embodiment of the hitch and receiver system is disclosed later in this description (see FIG. 4). The vertical receiver is affixed to main horizontal tongue member 22, and tongue braces 29a and 29b can be added to provide additional strength. Welds are commonly used to affix these components together, but other fastener means are within the scope of this invention. The vertical receiver has a tubular shape, a center aperture 20a and multiple transverse aperture pairs 20b are aligned with one another on opposite sides of the receiver. A ball support member 24 is affixed to the vertical receiver, and a hitch ball 26 is attached to and supported by the support member for towing a trailer (not shown) and the like. In addition, a safety chain attachment member 28 can be affixed to main horizontal tongue member 22. The vertical box receiver is in a position to support an accessory device (not shown) at the rear of vehicle 10. The components of hitch and receiver system S can be made using metallic or composite materials. The preferred material is a mild steel material. Components can be affixed one to the other using mechanical fasteners. However, the preferred method of affixing components together is by welding.

Figure 2A:
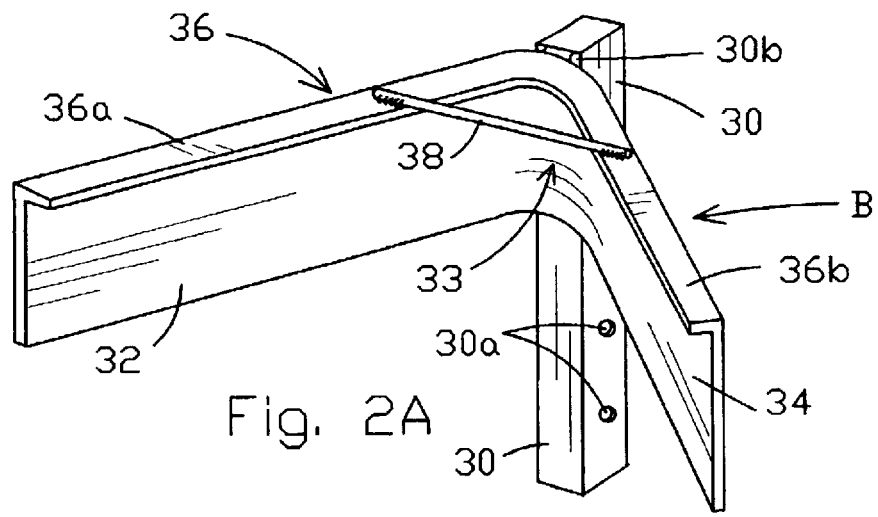
FIG. 2A is a perspective view of the hitch guide accessory device to be used with the universal hitch and receiver of FIG. 1 to form a universal hitch and receiver assembly of FIG. 2.
Figure 2:
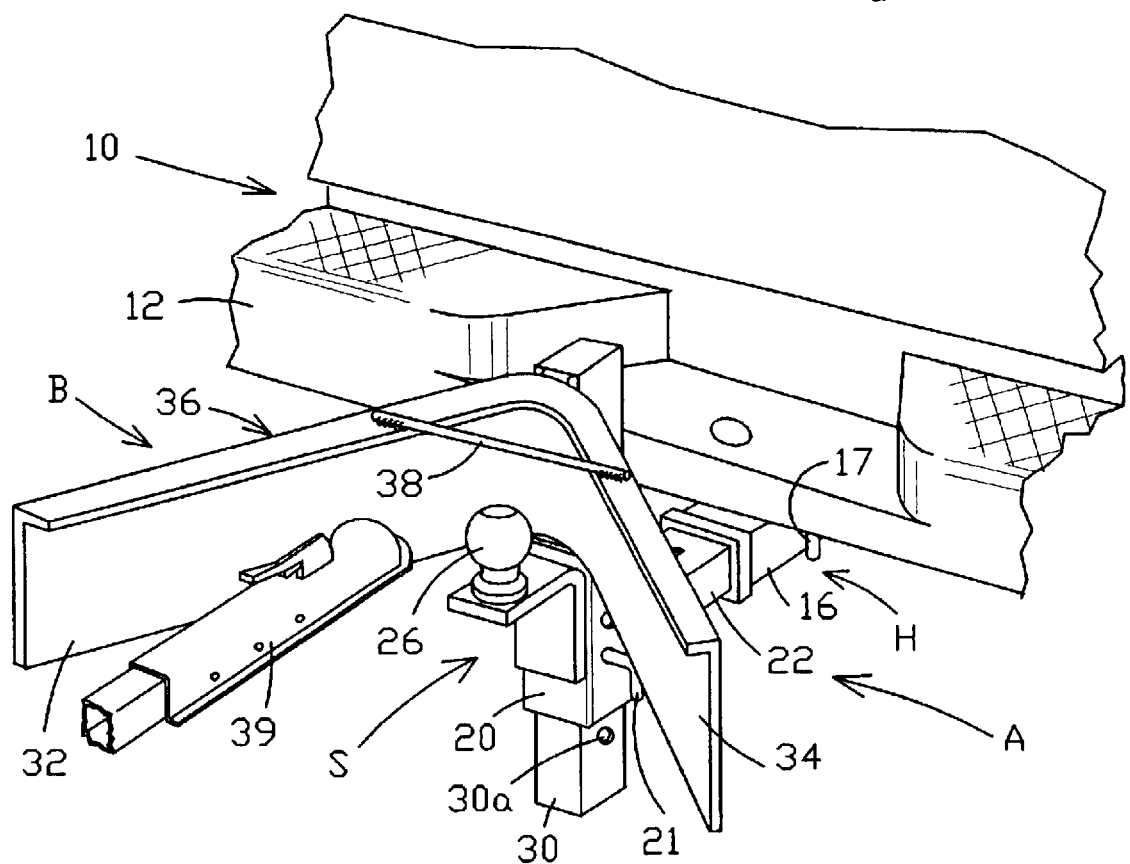
FIG. 2 is a perspective view of the universal hitch and receiver of FIG. 1 having a hitch guide accessory device with a vertical tongue member inserted in the vertical receiver and held in place by an accessory retainer pin.

In the illustration of FIG. 2, a hitch guide accessory device "B" has been installed in hitch and receiver system S to form an assembly "A". Once again, main horizontal tongue member 22 has been inserted in conventional box receiver 16 and held in place by main retainer pin 17. Details of the hitch guide accessory device are illustrated in FIG. 2A. The hitch guide accessory device includes a left guide plate 32 and a right guide plate 34 both extending at an acute angle relative to vehicle bumper 12 of vehicle 10. Vertical stop plates 36 are affixed to the top edge of each guide plate. Left stop plate 36a is affixed to the left guide plate and right stop plate 36b is affixed to the right guide plate and both extend at a right angle to the contact surface of each guide plate. The guide plates are affixed at one end to vertical tongue member 30. The vertical tongue member includes spaced apart transverse apertures 30a to correspond with the transverse aperture pairs of vertical box receiver 20. Left and right guide plates 32 and 34 may be formed as separate plates or as a single bent plate 31 with a center curved section 33 where the bent plate is affixed to the vertical tongue member by a weld 30b at the curved section. Alternately, the bent plate may be affixed to the vertical tongue member by a conventional fastener, such as a bolt through both members secured by a nut.

Vertical tongue member 30 is inserted in the center aperture of the vertical box receiver and an accessory retainer pin 21 is placed through an aperture pair of the vertical box receiver and a respective transverse aperture of the vertical tongue member, as illustrated in FIG. 2. When the trailer is being hitched with hitch and receiver system S the vehicle is moving toward the trailer and a coupler 39 of the trailer is approaching the hitch ball 26. The direct alignment of the coupler with the hitch ball is difficult, as they cannot generally be seen. Left and right guide plates 32 and 34 guide the coupler to be positioned directly above the hitch ball, so that the coupler can be lowered on the hitch ball to complete the hitching of the trailer to the vehicle. Any tendency of the coupler to go above the guide plates and damage the vehicle is stopped by the vertical stop plates 36.

A handle 38 can be provided to assist the user in transporting the hitch guide accessory device from place to place, and to help align vertical tongue member 30 with vertical box receiver 20 when placing the accessory device in the vertical box receiver. The handle can be a bar member affixed to the top of stop plates 36a and 36b in a location to keep the vertical tongue member generally vertical when supporting the accessory device by the handle.

The hitch guide accessory device can be subjected to large forces from the impact of coupler on the guide plates. The material used to make the hitch guide accessory device must have adequate strength to resist these forces. Various materials can be used such as a high strength aluminum or a composite material. The preferred material is a mild grade of steel.

Figure 3:
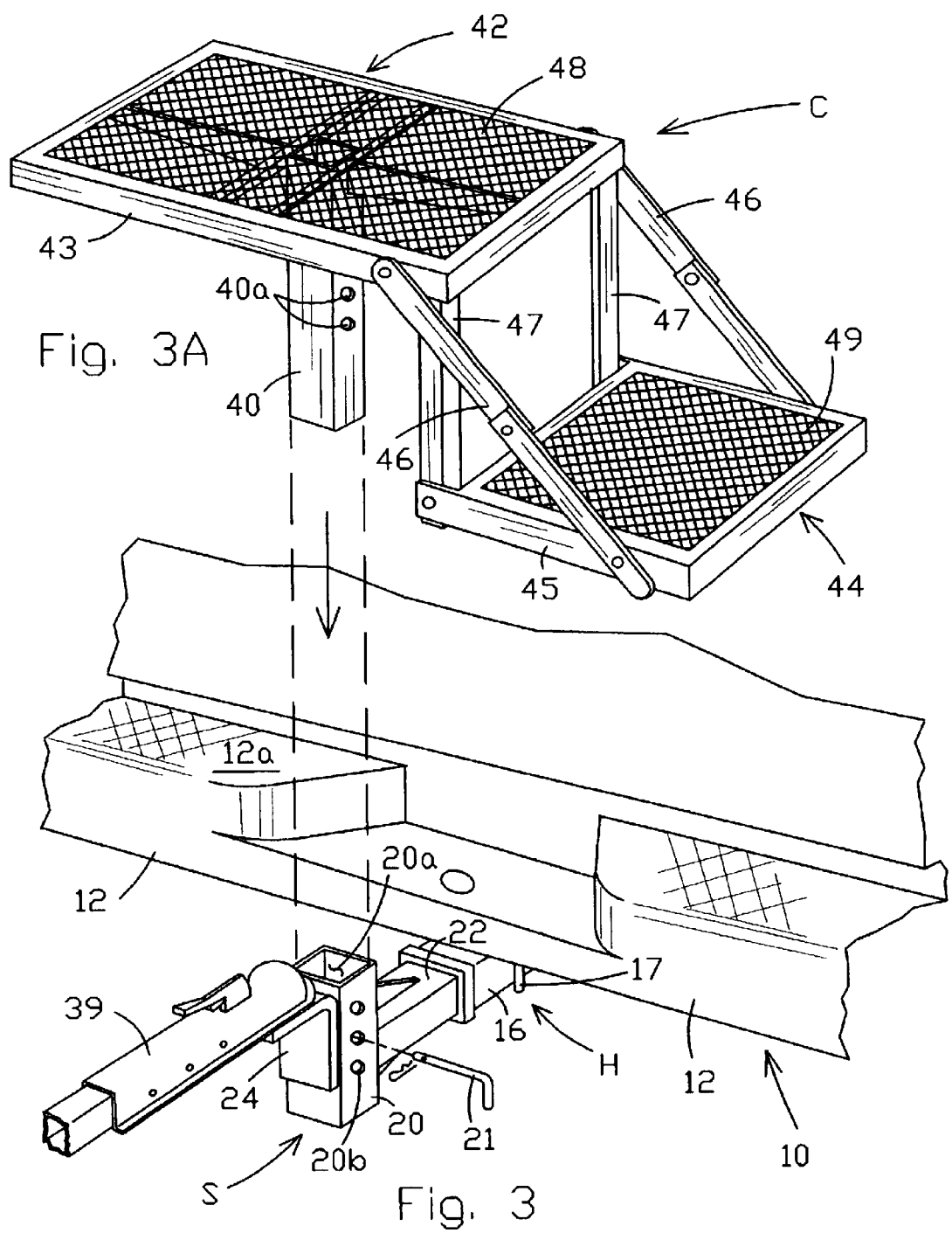
FIGS. 3 is a perspective view of a universal hitch and receiver of FIG. 1 having a coupler of a trailer attached to the hitch ball and the vertical receiver in a position to receive a vertical tongue member of an accessory device.

In another aspect of the invention the accessory device is an access platform and step accessory device "C" as illustrated in the exploded view of FIGS. 3 and 3A. Referring to FIG. 3A, an access platform 42 is disposed horizontally and comprises a perimeter platform frame 43 supporting a mesh material 48. A step 44 is supported in a horizontal plane below and to one side of the access platform by vertical support members 47 and diagonal brace members 46 extending from the access platform to the step. The step is also made with a perimeter frame 45 supporting a mesh material 49. The step can be made to be a folding step for transporting and storing the access platform and step accessory device. The diagonal brace members can have two generally equal sections hinged together at one end and hinged at their free ends to the access platform and the step respectively. The connection between the vertical support member and the step is also hinged. A vertical tongue member 40 having spaced apart apertures 40a is affixed to and supported below the access platform.

Vertical tongue member 40 is place in the vertical receiver of the hitch and receiver system S, as illustrated by the dashed lines and the arrow of FIG. 3. Vertical box receiver 20 receives the vertical tongue member so that aperture pairs 20a of the vertical box receiver are aligned with a respective aperture 40a of the vertical tongue member. Preferably the top of access platform 42 is adjusted in height to be made level with a top surface 12a of vehicle bumper 12. This position provides an additional horizontal area for supporting a person accessing portions of the vehicle and the trailer. Accessory retaining pin 21 placed through selected apertures holds access platform and step accessory device C attached to hitch and receiver system S. Main tongue member 22 is, once again, placed in conventional receiver 16 and held by main retainer pin 17 to support the universal hitch and receiver assembly in place relative to vehicle 10.

The access platform and step accessory device can be made to remain attached to hitch and receiver system S without removing coupler 39 from the hitch ball, as shown in FIG. 3. As long as the coupler is not restrained when it rotates about the hitch ball, there is no problem with access platform and step accessory device C remaining attached to the hitch and receiver system supported by ball support member 24. The access platform and step accessory device becomes very useful in accessing portions of whatever trailer system is connected to the coupler. For example, when the trailer is a boat trailer connected to the coupler, access to top surfaces at the front of the boat is made much easier. The vertical distance to a top surface of the boat is negotiated by using the step and the access platform in lieu of stepping on the narrow coupler to get into or out of the boat. The components of access platform and step accessory device C can be made using metallic or composite materials. The preferred material is a high strength aluminum. Components can be affixed one to the other using mechanical fasteners. However, the preferred method of affixing components together is by welding.

Figure 4:
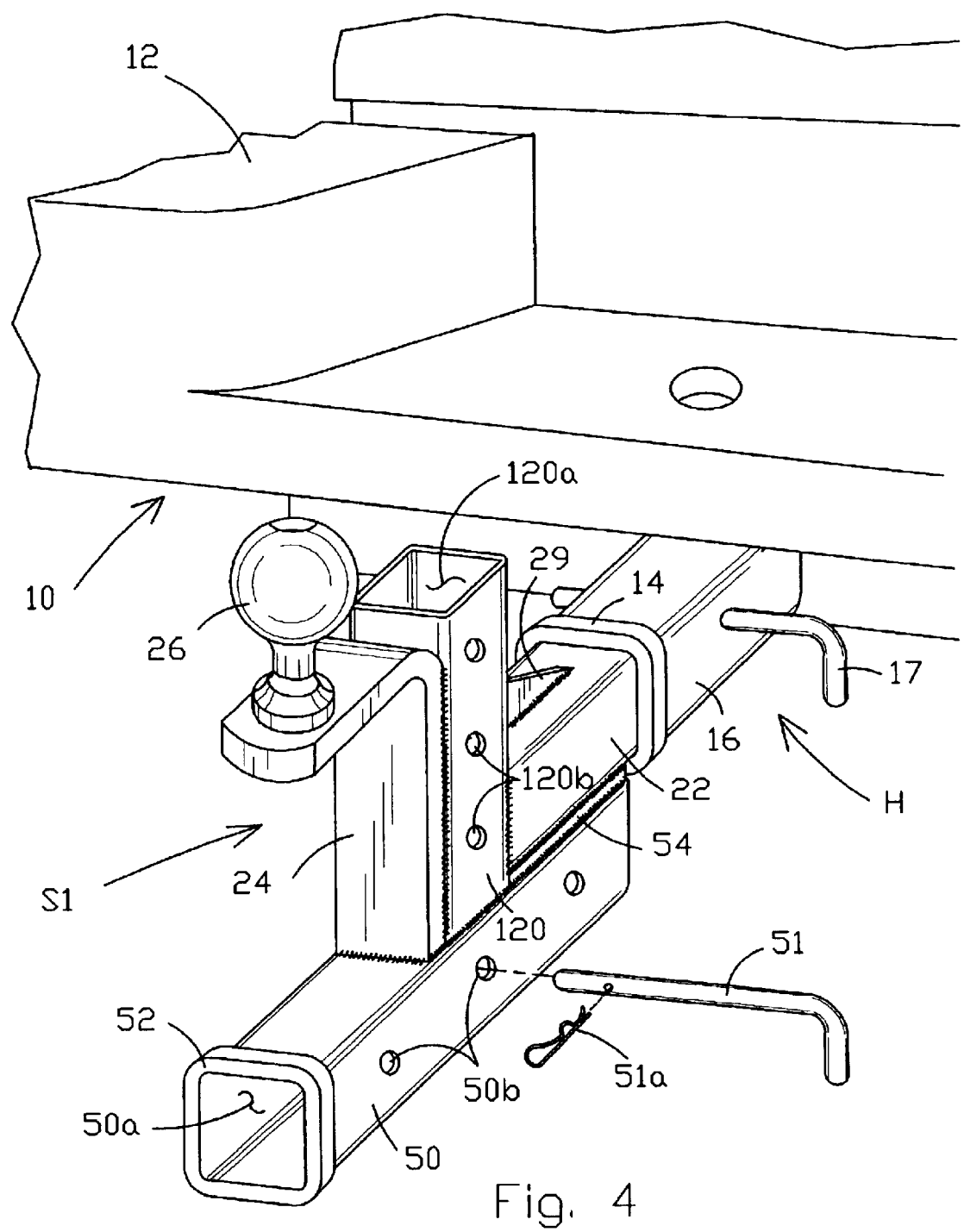
FIG. 4 is a perspective view of another embodiment of the universal hitch and receiver showing a vertical receiver and a horizontal receiver both affixed to a main horizontal tongue member inserted in a conventional receiver of the vehicle, the vertical and horizontal receivers each positioned to receive an accessory device or a stabilizing member of the accessory device.

In another embodiment of the invention a hitch and receiver system S1 is provided including a vertical box receiver 120 and a horizontal box receiver 50, as illustrated in FIG. 4. The vertical box receiver is generally has structural components and functions in the same manner as that described for vertical box receiver 20 of the first embodiment. The horizontal box receiver essentially replaces conventional box receiver 16 of vehicle hitch H. The addition of the horizontal box receiver to provide hitch and receiver system S1 allows the hitch ball system to remain in place when various accessory devices are being supported by vehicle 10 at a location below the rear bumper 12. As previously discussed, numerous accessory devices are known in the art that use the conventional box receiver, including load supports, tool platforms, cargo carriers, tailgate tables and bicycle racks to mention but a few. The vertical box receiver is again affixed to the main tongue member 22. Tongue brace member 29 is used to strengthen the connection between the main tongue member and the vertical box receiver. Horizontal box receiver 50 has a horizontal aperture 50a and transverse aperture pairs 50b. The horizontal box receiver is affixed to the bottom end of the vertical box receiver and to a spacer bar 54. The spacer bar is positioned between and affixed to both the main tongue member and the horizontal box receiver. The spacer bar positions the horizontal box receiver so that any accessory tongue member that fits into the horizontal aperture will clear collar 14 of conventional receiver 16. The components of hitch and receiver system S1 can be made using metallic or composite materials. The preferred material is a mild steel material. Components can be affixed one to the other using mechanical fasteners. However, the preferred method of affixing components together is by welding.

Once again, hitch ball 26 is connected to ball support member 24, as shown in FIG. 4. The ball support member is affixed to both the vertical and the horizontal box receivers to provide more strength for supporting the hitch ball. The two receivers 120 and 50 are both available for receiving an accessory tongue member to support and hold said accessory device at the rear of the vehicle. Accessory retainer pin 51 can be used in either aperture pairs of the vertical box receiver or the horizontal box receiver. Two accessory retainer pins are used when both added receivers are being used at the same time. The horizontal box receiver also has a collar 52 to protect the horizontal box to receiver from being damaged at the rear of the vehicle.

Figure 5:
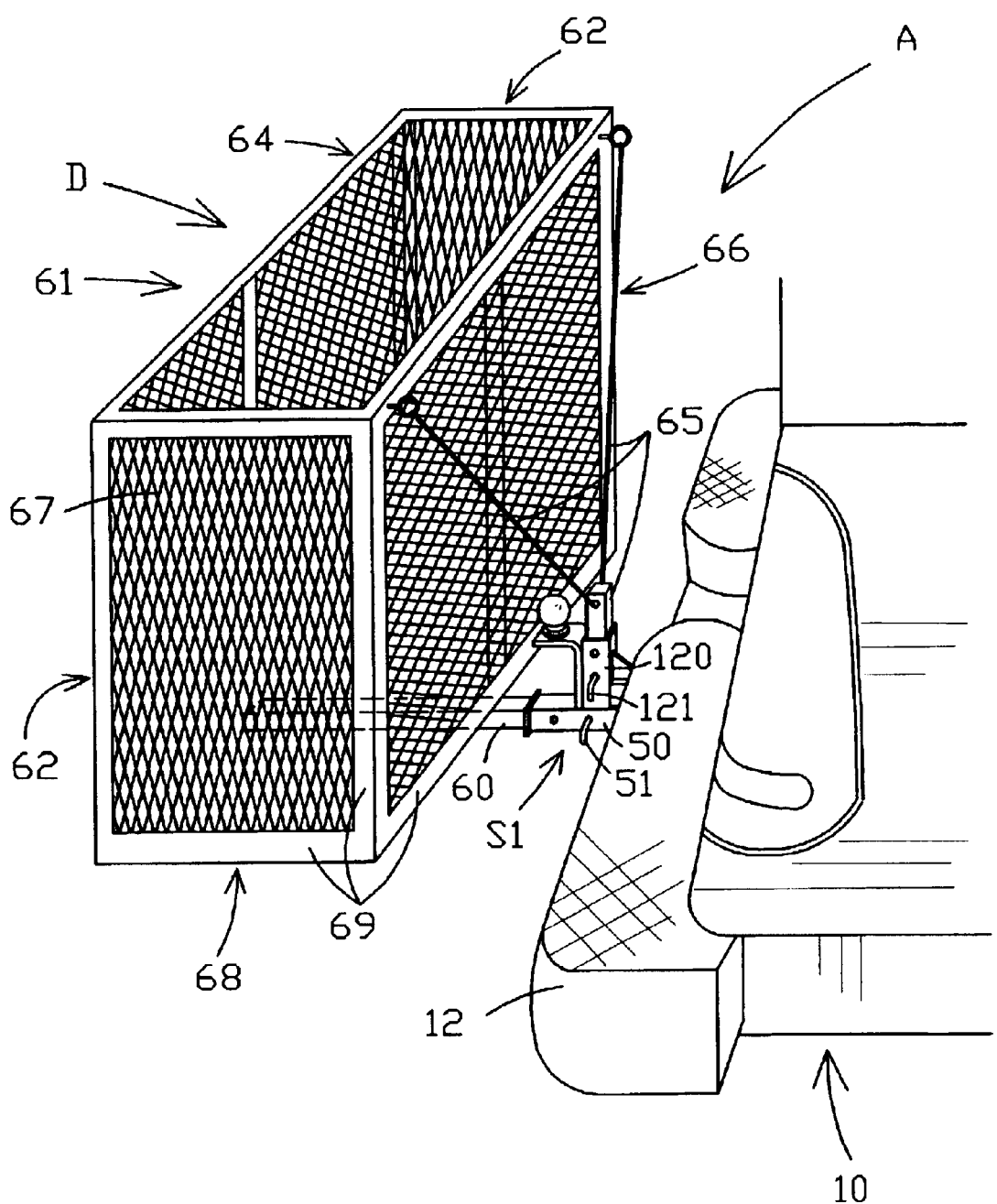
FIG. 5 is a perspective view of a universal hitch and receiver of FIG. 4 having a cargo cage accessory device with a horizontal tongue member inserted in the horizontal vertical receiver and held in place by an accessory retainer pin and stabilizer members inserted in the vertical receiver.

In one aspect of the second embodiment of the invention the accessory device is a cargo cage accessory device "D", as illustrated in FIG. 5. A horizontal tongue member 60 of the cargo carrier accessory device fits into horizontal box member 50 of hitch and receiver system S1. Accessory retainer, pin 51 holds and secures the horizontal tongue member in the horizontal box receiver. The hitch and receiver system is again connected with the conventional receiver of the vehicle hitch (not shown) below rear bumper 12 of vehicle 10. The cargo carrier accessory device includes a plurality of wall panels 61 comprising a pair of side panels 62, a back panel 64 and a front panel 66. A bottom panel 68 completes the open top enclosure for holding and transporting cargo. Cage frame 69 provides structural support for a mesh 67 to form each of the wall panels and the bottom panel. The horizontal tongue is affixed to the bottom panel of the cargo carrier accessory device .

An optional aspect of the cargo cage accessory device is the addition of a stabilizer system 65 to help support the accessory device. Generally speaking, when one of either the horizontal or the vertical box receiver is being used to hold and support an accessory device, the other box receiver can be used to support the stabilizer system. The stabilizer system illustrated in FIG. 5 includes a post with two cables attached. Each cable extends to an eyelet at a corner of the cargo cage accessory device. The post fits into vertical box receiver 120 and is held in place by accessory retainer pin 121. The eyelets are attached to cage frame 69. The stabilizer system provides vertical as well as lateral support to cargo cage accessory device D.

Figure 5A:
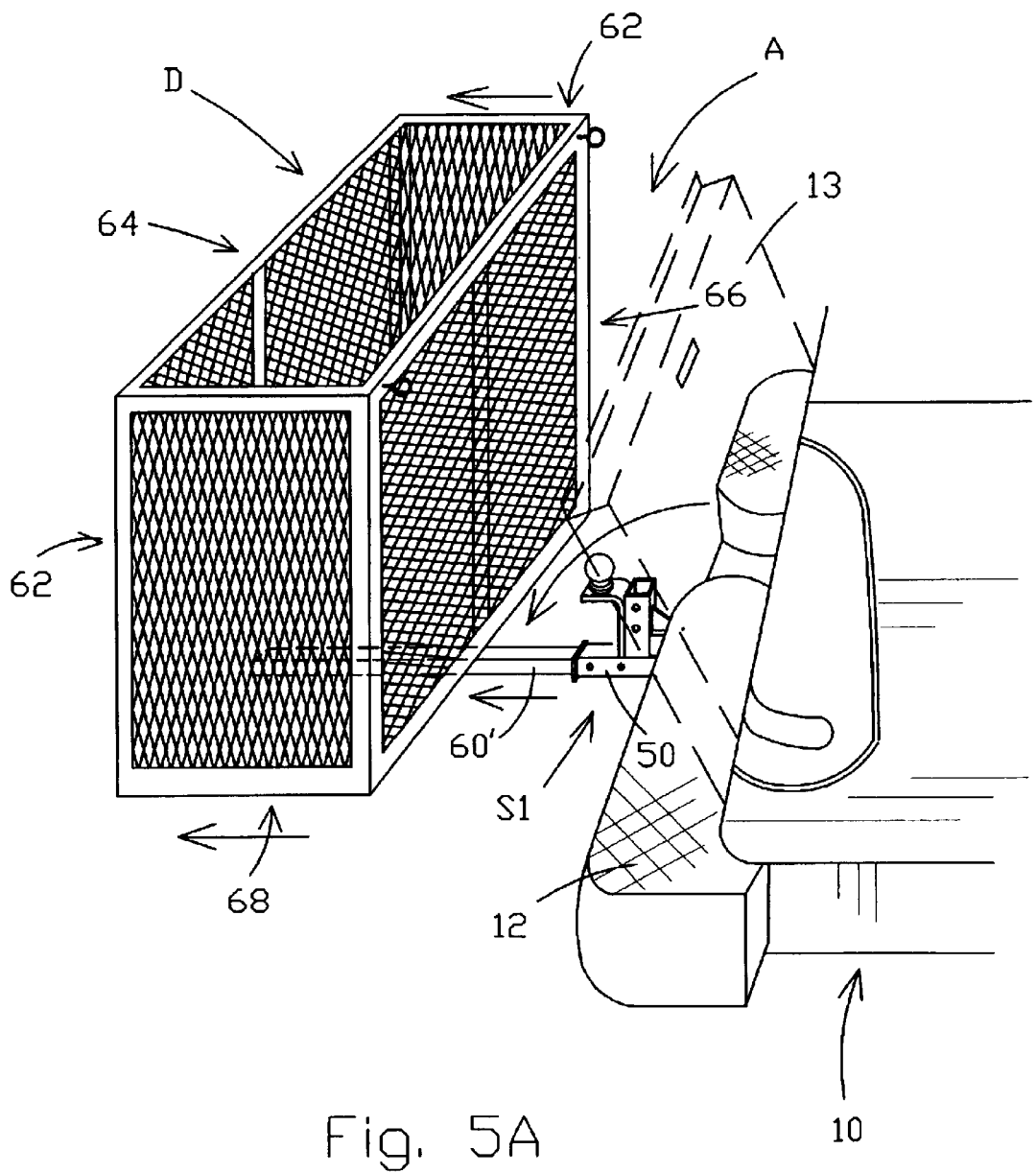
FIG. 5A is a perspective view of a universal hitch and receiver of FIG. 4 again having a cargo cage accessory device, wherein the a horizontal tongue member is partially inserted in the horizontal vertical receiver so that a tail gate of the vehicle can be lowered without removing the accessory device from the horizontal receiver.

Another unique feature of universal hitch and retainer assembly A is illustrated in FIG. 5A. The horizontal tongue member of cargo cage accessory device D can be an elongated horizontal tongue member 60'. With an elongated tongue member the accessory retainer pin and the support system are removed so that the cargo cage accessory device can be moved away from bumper 12, as shown by the arrows, to allow a tail gate 13 of vehicle 10 to be opened to a horizontal position. The tail gate is shown in dashed lines with an arrow indicating the rotation of the tail gate relative to the vehicle. The elongated horizontal tongue member slides inside horizontal box receiver 50, but is not removed from the horizontal box receiver so that hitch and receiver system S1 continues to support the cargo cage accessory device. The panels of the cargo cage accessory device including side wall panels 62, back panel 64, front panel 66 and bottom panel 68 remain to carry the cargo while accessing the rear of the vehicle.

While a preferred embodiment of the invention has been described using specific terms, such description is for illustrative purposes only, and it is to be understood that changes and variations may be made without departing from the spirit or scope of the following claims.

What is claimed is:

1. A combination hitch and receiver system and assembly connected to a box receiver of a vehicle hitch for towing a trailer with a hitch ball, said hitch and receiver system comprising:

a main horizontal tongue member having a size and shape to be placed into and held by the box receiver of the vehicle hitch;

an elongated vertical box receiver, affixed to said main tongue member, having a tubular shape, a center aperture and multiple spaced apart transverse aperture pairs;

a ball support member affixed to said elongated vertical box receiver for receiving and supporting the hitch ball for towing the trailer, wherein said main horizontal tongue member, said vertical box receiver and said ball support member are made as a single unit to include the ball hitch; and an elongated horizontal box receiver affixed below said main tongue member in addition to said elongated vertical box receiver as a unit, said horizontal box receiver also having a tubular shape, a center aperture and transverse aperture pairs so that said vertical and horizontal box receivers are both available at the rear of the vehicle to receive an accessory device without removal of the hitch ball.

2. The system of claim 1 wherein said accessory device has an accessory tongue member to be removably placed in said center aperture of one of said elongated vertical box receiver and said elongated horizontal box receiver to provide the assembly, wherein a respective box receiver envelops said accessory tongue member and said accessory tongue member supports and holds said accessory device in a generally stationary position relative to the vehicle hitch at the rear of the vehicle and wherein said accessory device can be removed prior to towing the trailer with the hitch ball.

3. The assembly of claim 2 wherein said accessory device is a hitch guide accessory device having a single vertical tongue member with spaced apart transverse apertures and a pair of guide plates with stop plates for providing alignment assistance in connecting the hitch ball with the trailer.

4. The assembly of claim 2 wherein said accessory device is an access platform and step having a vertical tongue member for placement in said vertical box receiver for supporting said access platform and step to provide assistance in accessing both exterior and interior areas of the vehicle.

5. The assembly of claim 2 wherein said accessory device is a cargo cage device having an elongated horizontal tongue member, for placement in said horizontal box receiver, vertical wall panels and a bottom panel for receiving and transporting cargo from place to place without the need for removing said hitch ball.

6. The assembly of claim 5 wherein said cargo cage device includes a framework supporting wire mesh to form said vertical wall panels.

7. The assembly of claim 6 including a retainer pin and spaced apart apertures in said horizontal tongue of said cargo cage device to be aligned with said transverse aperture pairs of said horizontal box receiver, wherein said retainer pin is placed through both said transverse aperture pairs of said horizontal box receiver and corresponding said aperture of said horizontal tongue to support and hold said cargo cage device attached to said horizontal box receiver so that said cargo cage placement of said retainer pin can be adjusted to gain access to the rear of the vehicle.

8. The assembly of claim 2 wherein one of either said horizontal or said vertical box receiver is used to receive said accessory tongue member of said accessory device and the other one of either said horizontal box receiver or said vertical box receiver is used to receive a stabilizer system for said accessory device.

9. A hitch and receiver assembly for a box receiver of a vehicle hitch to assist in connecting with a coupler of a trailer comprising:

a main horizontal tongue member having a size and shape to be placed into and held by the box receiver of the vehicle;

an elongated box receiver affixed to said main horizontal tongue member having a tubular shape, a center aperture and multiple transverse aperture pairs;

a ball support member affixed to said elongated box receiver for receiving and supporting a hitch ball for towing the trailer;

a hitch guide accessory device including a tongue member removably placed in said center aperture of said at least one elongated box receiver, wherein said tongue member supports and holds said hitch guide accessory device in a generally stationary position relative to the vehicle hitch and wherein said hitch guide accessory device is removed prior to towing the trailer with said hitch ball;

said box receiver is a single vertical box receiver for receiving a single vertical tongue member of said hitch guide accessory device to support and hold said hitch guide accessory device generally above said hitch ball at the rear of the vehicle; and said hitch guide accessory device includes a pair of guide plates having vertical stop plates on the top edge for providing assistance in connecting with the trailer by directing the coupler of the trailer to be directly above the hitch ball wherein the guide plates form a width to receive the coupler much larger than the width of the coupler.

10. The apparatus of claim 9 wherein said pair of guide plates are made as a single bent plate with flat guide plates on each side of the centrally located bent portion and include a handle attached to the top edge to help transport said hitch guide from place to place.

* * * * *